United States Patent
Ash

[11] 3,836,787
[45] Sept. 17, 1974

[54] APPARATUS FOR EXAMINING THE SURFACE OF AN OBJECT USING ELECTROMAGNETIC RADIATION

[75] Inventor: Eric Albert Ash, London, England

[73] Assignee: National Research Development Corporation, London, England

[22] Filed: July 7, 1972

[21] Appl. No.: 269,875

[30] Foreign Application Priority Data
July 16, 1971  Great Britain.................... 33560/71

[52] U.S. Cl.......... 250/572, 250/237 R, 350/162 R, 356/118, 356/120
[51] Int. Cl. ......................................... G01n 21/30
[58] Field of Search ............ 250/219 DF, 225, 237; 350/162; 356/118, 119, 120, 209, 212

[56] References Cited
UNITED STATES PATENTS

| | | | |
|---|---|---|---|
| 3,336,832 | 8/1967 | Snavely............................ | 250/225 |
| 3,497,703 | 2/1970 | Weber.............................. | 250/225 |
| 3,504,983 | 4/1970 | Richmond........................ | 356/209 |
| 3,589,815 | 6/1971 | Hosterman....................... | 356/120 |
| 3,591,291 | 7/1971 | Greer............................... | 356/120 |
| 3,602,596 | 8/1971 | Astheimer........................ | 356/120 |
| 3,715,165 | 2/1973 | Smith............................... | 356/209 |

*Primary Examiner*—James W. Lawrence
*Assistant Examiner*—D. C. Nelms
*Attorney, Agent, or Firm*—Cushman, Darby & Cushman

[57] ABSTRACT

In order to examine the surface of an object to view detail substantially smaller than the wavelength of the radiation used, the object is mounted behind a plate having an aperture of size equal to the desired resolution and radiation is directed on to the plate and thence, through the aperture on to the surface of the object. The object is vibrated relative to the plate so that light reflected from the surface of the object back through the aperture is modulated with the frequency of this vibration and can thus be distinguished from radiation reflected from the surface of the plate. The apparatus can operate with electromagnetic radiation of optical and microwave frequencies.

8 Claims, 4 Drawing Figures

APPARATUS FOR EXAMINING THE SURFACE OF AN OBJECT USING ELECTROMAGNETIC RADIATION

This invention relates to apparatus for examining the surface of an object using electromagnetic radiation and is particularly concerned with apparatus having a resolution which is not limited by the wavelength of the radiation.

According to the invention, apparatus for examining the surface of an object comprises a plate containing an aperture, mounting means for the object to be examined so arranged that, in use, the object is supported with the surface to be examined and adjacent to said plate and confronting said aperture, means for directing a beam of electromagnetic radiation on to said aperture from the side of the plate remote from the object, and means for detecting radiation reflected back through said aperture and the surrounding surface of the plate, the arrangement being such that, in use, radiation reflected from said object has a characteristic distinguishing it from radiation reflected from said plate.

According to one form of the invention, apparatus for examining the surface of an object comprises a plate containing an aperture, mounting means arranged so that, in use, the object is supported with the surface to be examined adjacent to said plate and confronting said aperture, means for directing a beam of electromagnetic radiation on to said aperture from the side of the plate remote from the object, and means for detecting radiation reflected back through said aperture and the surrounding surface of said plate, the mounting means including means for vibrating the object relative to the plate whereby radiation reflected from said object is modulated with the frequency of said vibration.

If the diameter of the aperture is substantially less than the wavelength of the radiation, a beam of such radiation incident on the aperture would also illuminate a substantial area of the surrounding part of the plate. Consequently, the reflected radiation will be partly from the surface of the plate and partly from the portion of the surface of the object which is aligned with the aperture. Since the object is vibrated relative to the plate, the light reflected therefrom will be modulated with the frequency of vibration while the light reflected from the surface of the plate will not be so modulated. Thus by observing changes in the modulated components of the reflected radiation as the object is moved transversely relative to the aperture, information about the surface of the object can be obtained with a resolution determined by the diameter of the aperture, which can be significantly smaller than the wavelength of the radiation.

An alternative way of distinguishing radiation reflected from the object from that reflected from the surface of the plate is to employ polarized radiation and detect rotation of the plane of polarization. Provided that the surface of the plate is smooth, radiation reflected from it will be polarized in the same direction as the incident radiation. Any departure from the smoothness of the surface to be examined will lead to rotation of the plane of polarization of radiation reflected from it. It is important that the aperture in the plate should be accurately circular since any irregularity would also cause rotation of the plane of polarization.

Both the above methods of separating radiation reflected from the plate from radiation reflected from the surface being examined can be used together if required.

The invention is particularly suitable for use with radiation at optical frequencies, i.e., visible or infra-red frequencies, but can also be used with radiation of microwave frequencies.

The invention will be more readily understood from the following description of embodiments thereof with reference to the accompanying drawings, in which.

Figure 1:
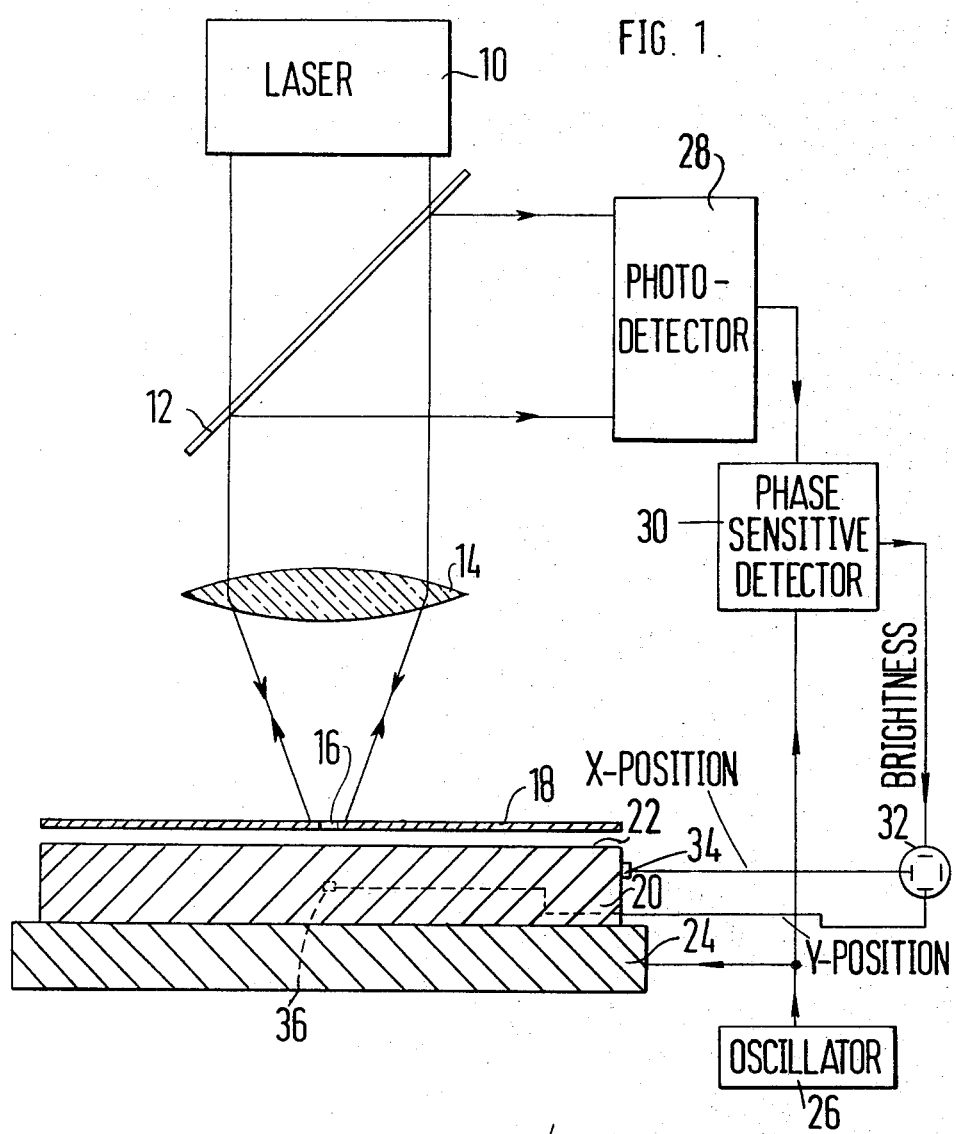
FIG. 1 is a schematic diagram of an embodiment of the invention for use at optical or infra-red frequencies.

Referring to FIG. 1, a laser 10 is arranged to direct a beam of light through a 50 percent reflective mirror 12 on to a lens 14 which focusses the beam on an aperture 16 in a plate 18. An object 20 whose surface 22 is to be examined is mounted on a longitudinal acoustic wave transducer 24 with the surface 22 closely adjacent to and confronting the plate 18 on the opposite side from the laser. An audio frequency oscillator 26 is provided for energizing the transducer 24.

At least the part of the plate 18 in the immediate vicinity of the aperture 16 comprises a film of a reflective material such as silver or aluminium. An aperture having a diameter as small as one tenth of the wavelength of visible light can be made in such a film using electron beam resist techniques. However, even using a high quality lens for the lens 14, the width of the spot at the focus of the beam is unlikely to be smaller than one wavelength in diameter and will probably be rather larger. Consequently, less than 1% of the incident light will pass through the aperture 16 and be reflected from the surface 22. However, since the object 20 is mounted on the transducer 24, it can be vibrated relative to the plane of the plate 18 so that the light reflected from the surface 22 will be modulated with the frequency at which the transducer 24 is energized while that reflected from the surface of the plate is unmodulated.

The reflected light is collimated by the lens 14 and reflected by the reflector 12 on to a photodetector 28. The output of the photodetector 28 is connected to one input of an electronic phase sensitive detector 30. The other input of the phase sensitive detector 30 is connected to the output of the oscillator 26 so that the output of the phase sensitive detector 30 consists of the modulated component of the output of the photodetector 28, i.e., that which is due to light reflected from the surface 22.

The output of the phase sensitive detector 30 may be displayed on the screen of a cathode ray tube 32. The output of the phase sensitive detector 30 is used to control the brightness of the cathode ray tube beam while the deflection thereof in the X and Y directions are controlled by respective sensors 34 and 36 which are arranged to detect movement of the object 20 relative to the aperture 16 in two mutually perpendicular directions which are also perpendicular to the plane of the surface 22.

Figure 2:
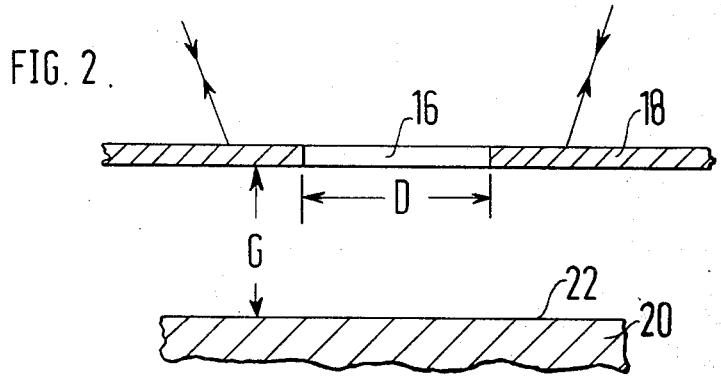
FIG. 2 is a schematic diagram illustrating part of the embodiment of FIG. 1.

Referring to FIG. 2, the diameter of the aperture 16 is indicated by the arrows D and the spacing between the plate 18 and the surface 22 of the object 20 by the arrows G. Since, as stated above, the diameter D is smaller than the wavelength of the incident light, illumination will diffract from the aperture 16 very nearly over the whole half space. Consequently, it is essential that the distance G is of the same order as or preferably smaller than the diameter D. On the other hand, since the vibration of the object is used to discriminate light reflected therefrom from light reflected from the plate 18, the object 22 must be isolated from vibrations of the plate 18. Consequently, when the vibrations take place in a direction normal to the plane of plate 18 the amplitude of vibration of the object must be slightly less than the distance G. A suitable distance for the amplitude of vibration would be one-third G.

Figure 3:
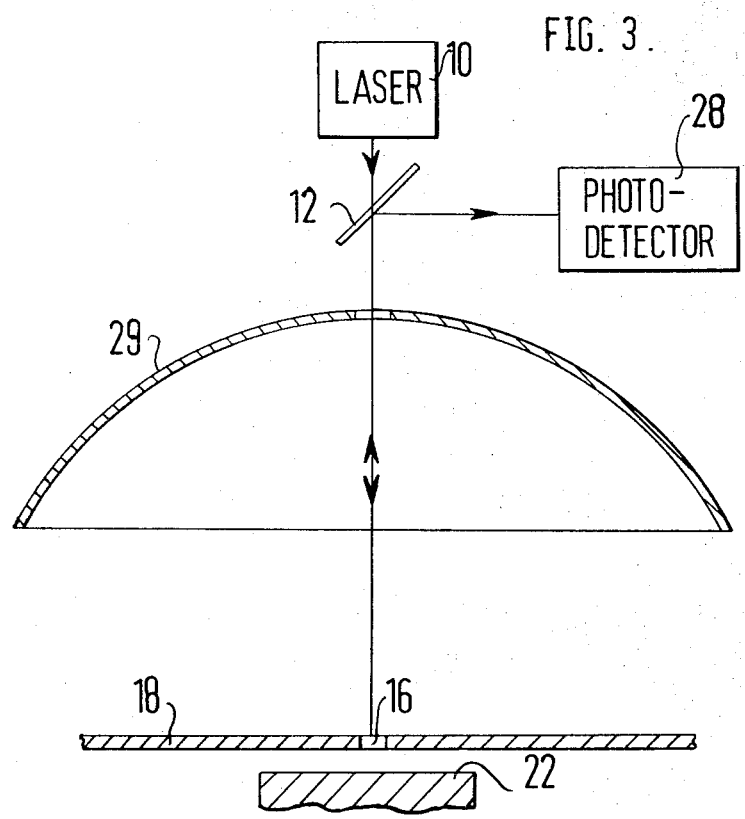
FIG. 3 is a schematic diagram illustrating a modification of the embodiment shown in FIG. 1.

FIG. 3 illustrates a modification of the apparatus shown in FIG. 1 in which a resonator is used to increase the level of illumination. As before, the output from the laser 10 is directed through the 50 percent reflector 12 but thereafter, the radiation is incident through a hole in a spherical reflector 29 which is mounted with its centre of curvature approximately coincident with the surface 22 immediately under the aperture 16.

Figure 4:
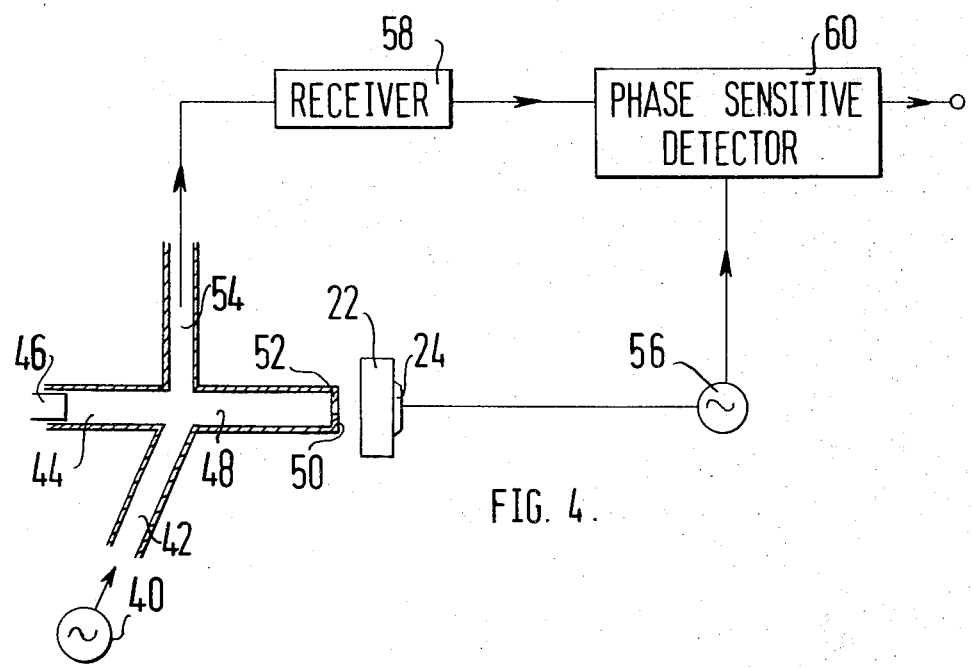
FIG. 4 is a schematic diagram illustrating an embodiment of the invention for use at microwave frequencies.

FIG. 4 illustrates an embodiment of the invention suitable for use at microwave frequencies. The object 20 which is to be examined is mounted on a transducer so that it can be vibrated preferably at an acoustic frequency and preferably in a direction perpendicular to the surface 22 which is to be examined. However, the source of electromagnetic radiation is a microwave frequency oscillator 40 whose output is connected to an arm 42 of a so-called 'magic T' or 'hybrid T'. Of the two side arms of the hybrid T, one, 44 is closed by a reflector 46 while the other, 48 is closed by a plate 50 containing an aperture 52 of diameter less than the wavelength of the output signal from the oscillator 40. The power of the signal produced in the fourth arm 54 of the hybrid T depends on whether the signals reflected in the side arms 44 and 48 are in phase with each other when they meet at the intersection of the hybrid T. The position of the reflector 46 is adjusted so that signals reflected by it are out of phase with the signal reflected from the plate 50 so as to minimize the signal in the arm 54.

The transducer 24 is energised by an oscillator 56 and the consequent vibration of the object 20 causes consequent periodic changes in the relative phase of the signal reflected from the reflector 46. Thus the resulting signal in the arm 54 is modulated by the output of the oscillator 56.

The output signal from the arm 54 is fed to a receiver 58 and thence to a phase sensitive detector 60 which also has an input connected to the output of the oscillator 56. The resulting output signal from the phase sensitive detector 60 is dependent on the average distance of the particular part of the surface 22 from which signals are being reflected from the aperture 52 and thus changes with the profile of the surface.

The method of displaying the output on a cathode ray tube, which was described with reference to FIG. 1, may also be used with the embodiment shown in FIGS. 3 and 4.

The resonator illustrated in FIG. 3 may also be used with the embodiment employing microwaves, illustrated in FIG. 4. In this case, the arm 48 of the 'hybrid T' is connected to the aperture in the reflector 28; the reflector 28 need not be spherical, ideally it should be parabolic; any open resonator with a reflective shape may be used provided that it is so disposed relative to the surface of the object to be examined that a stable resonant mode is obtained.

The 50 percent mirror 12 of the embodiment shown in FIG. 1 and the hybrid T of the embodiment shown in FIG. 4 are merely examples of arrangements which can be used to separate the incident from the reflected beam at optical and microwave frequencies respectively. Other means of effecting the separation can be used.

The vibrations imparted to the object 20 by the oscillator 26 or 56 may be of any convenient frequency. Frequencies in the audio range have been found to be useful but considerably higher frequencies can be used. The frequency of vibrations must be different from that of the frequency of the radiation used, but, apart from this, the only upper limitation on frequency is that imposed by the generation of a very high vibration frequency with a significant amplitude.

As already mentioned, less than 1 percent of the incident radiation passes through the aperture 16 in the plate 18 of FIG. 1 or the aperture 52 of FIG. 4. Consequently, the detector for the reflected radiation has to be capable of handling received signals about 100 times greater than the signal modulated with the vibration frequency of the object to be examined. A convenient means of separating some of the unwanted reflected signal before it is incident on the detector is to use polarized radiation. Provided that the surface of the plate is smooth, the radiation reflected from it will be polarized in the same direction as the incident radiation. If the surface to be examined was also smooth, the direction of polarization of radiation reflected from such surface would also be unaltered but there would then, of course, be no surface detail to be examined. Any departure from smoothness of the surface to be examined will cause the plane of polarization of radiation reflected from such surface to be rotated relative to the plane of polarization of the incident radiation. Consequently, if a polarizer set to reject light polarized in the same direction as the incident radiation is placed in front of the detector, such detector is protected from receiving reflected radiation from the surface of the plate and consequently can be made more sensitive.

If when polarized radiation is used, the aperture in the plate is accurately circular, the only cause of rotation of the plane of polarization of the radiation is irregularities in the surface to be examined. Consequently, it is unnecessary to vibrate the object in order to separate the required reflected radiation. However, it is frequently difficult to make an aperture with the required accuracy so it will usually be preferable to vibrate the object in order to separate radiation with a rotated plane of polarization due to irregularities of the surface to be examined from radiation with a rotated plane of polarization due to irregularities in the circularity of the aperture. The use of polarized radiation in this latter case means that radiation reflected from the surface of the plate, which constitutes most of the total reflected radiation, is rejected before it reaches the detector.

I claim:

1. Apparatus for examining physical characteristics of the surface of an object comprising a plate containing an aperture, mounting means for the object to be examined so arranged that, in use, the object is supported with the surface to be examined adjacent to said plate and confronting said aperture, means for directing electromagnetic radiation on to said surface of the object and said plate, and means for detecting said electromagnetic radiation reflected back through said aperture and from the surface of the plate surrounding said aperture, the arrangement being such that, in use, radiation reflected from the said object has a characteristic distinguishing it from radiation reflected from said plate.

2. Apparatus as claimed in claim 1 in which the beam of electromagnetic radiation is polarized and a polarizer is disposed in front of the detecting means and oriented to reject radiation polarized in the same direction as said beam of electromagentic radiation.

3. Apparatus as claimed in claim 1 in which the means for directing a beam of electromagnetic radiation on to the aperture includes a microwave oscillator whereby said reflected electromagnetic radiation comprises microwave radiation.

4. Apparatus as claimed in claim 3, including a hybrid T having a first arm connected to the oscillator, a second arm closed by said plate, a third arm opposite said second arm closed by an adjustable reflector and a fourth arm connected to said means for detecting radiation.

5. Apparatus for examining the surface of an object, comprising a plate containing an aperture, mounting means for the object to be examined so arranged that, in use, the object is supported with the surface to be examined adjacent to said plate and confronting said aperture, means for directing a beam of electromagnetic radiation on to said aperture from the side of the plate remote from the object, and means for detecting radiation reflected back through said aperture and from the surface of the plate surrounding said aperture, the mounting means including means for vibrating the object relative to the plate whereby radiation reflected from said object is modulated with the frequency of said vibrations.

6. Apparatus as claimed in claim 5 including an open resonator located on the side of the plate remote from the mounting means and so disposed relative to the surface to be examined that, in use, a stable resonant mode is obtained, said resonator having an aperture aligned with said beam of electromagnetic radiation.

7. Apparatus as claimed in claim 5 in which said means for directing a beam of electromagnetic radiation on to the aperture includes a source of optical frequency radiation.

8. Apparatus as claimed in claim 7, in which said source of optical frequency radiation comprises a laser.

* * * * *